United States Patent
Anderson

[15] 3,707,223
[45] Dec. 26, 1972

[54] ANTI-BRIDGING MEANS FOR BULK FRUIT FEED SUPPLY

[72] Inventor: Earl R. Anderson, Los Gatos, Calif.

[73] Assignee: Brex Corp., Trustee, Los Gatos, Calif.

[22] Filed: Sept. 18, 1970

[21] Appl. No.: 73,419

[52] U.S. Cl. ................................................ 198/185
[51] Int. Cl. .............................................. B65g 15/00
[58] Field of Search ........ 198/25, 185; 221/203, 277; 222/280, 281

[56] References Cited

UNITED STATES PATENTS

| | | |
|---|---|---|
| 1,034,641 | 8/1912 | Parker ................................. 198/20 R |
| 3,164,239 | 1/1965 | Reed .................................... 198/20 R |
| 3,433,347 | 3/1969 | Molins et al. ....................... 198/37 X |
| 2,918,197 | 12/1959 | Ritscher et al. ...................... 221/277 |
| 3,302,767 | 2/1967 | Kuhl et al. ............................. 198/25 |

Primary Examiner—Richard E. Aegerter
Assistant Examiner—H. S. Lane
Attorney—Allen and Chromy

[57] ABSTRACT

A fruit feed system comprising a bulk supply conveyor for rollable fruit articles from which fruit is fed through a side discharge opening past a bridge preventing means to guard against fruit bridging across and blocking the opening. Anti-bridging rolls are provided at either side of the opening for projecting article feeding elements to active position anytime bridging begins.

5 Claims, 4 Drawing Figures

PATENTED DEC 26 1972 3,707,223

INVENTOR.
EARL R. ANDERSON

Allen and Chromy
ATTORNEYS

ANTI-BRIDGING MEANS FOR BULK FRUIT FEED SUPPLY

DESCRIPTION OF THE INVENTION

In the feeding of field run fruit to one or a plurality of processing mechanisms of various characters, such as graders or pitters, it is desirable that the fruit be fed from a bulk supply provided by a pair of "merry-go-round" conveyors and discharged through a side opening which will not become clogged because of bridging of the fruit.

It is a general object of the invention to provide an entrance opening from a bulk feed supply of fruit which has automatically operable means for preventing bridging of the opening by a row of fruit.

Other objects and advantages of the invention will be apparent from the following description of a preferred embodiment thereof, made with reference to the accompanying drawings, in which.

Figure 1:
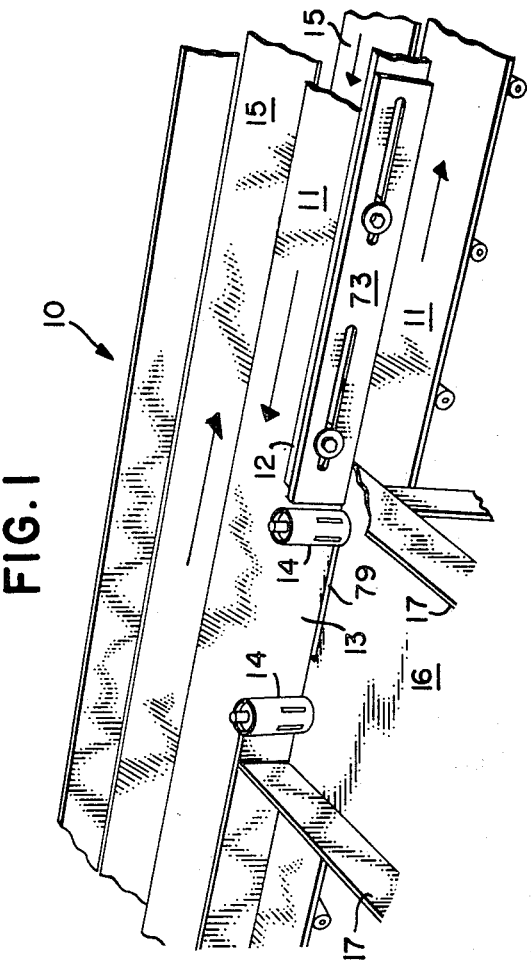
FIG. 1 is a schematic perspective view of the fruit feed system.
Figure 2:
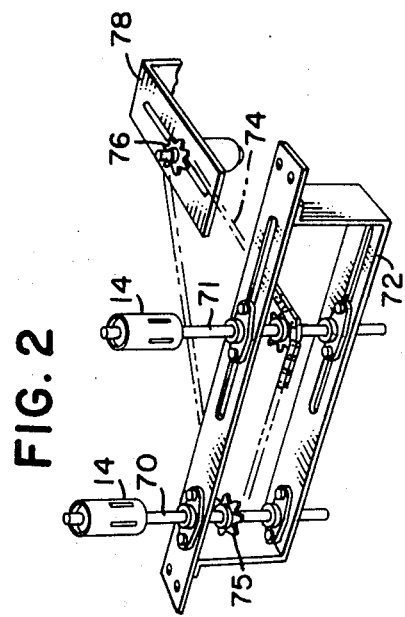
FIG. 2 is a schematic perspective view of the drive for the anti-bridging means.

Referring to FIG. 1, the fruit feed system includes a bulk feed mechanism 10 of the "merry-go-round" type, having a feed conveyor 11 with its upper active stretch moving in the direction of the arrow in FIG. 1 and maintained in slanted condition toward the retaining wall 12 at one side of the conveyor, and a feed opening 13 is provided therein between two anti-bridging rollers 14, referred to more particularly hereinafter, and leading to an inclined hopper 16 between respective side walls 17. A return conveyor 15 is also provided.

Referring to FIGS. 1, 2, 3 and 4, the anti-bridging elements 14 are shown as mounted on respective shafts 70 and 71, journaled in U-shaped bracket 72. The bracket 72 is connected to and mounted on the adjustable slide plate 73 so that the position of the right hand anti-bridging element 14 can be adjusted and the width of the feed opening can be varied. The left hand anti-bridging element has its shaft 71 mounted in fixed bracket 72a. Both of the anti-bridging elements 14 are driven by suitable drive means and can operate in either direction. The interconnecting drive means comprises a chain 74 engaging respective sprockets 75 on the shafts 70 and 71 and a takeup sprocket 76 mounted in a slotted bracket 78 so that it can be adjustably clamped in any desired position along the slot of the bracket 78 as the right hand anti-bridging element is moved in and out to change the size of the fruit admitting opening 13. A slot 79 in the bottom of the hopper 16 provides for this adjustment.

Each anti-bridging element 14 comprises a cylinder (FIGS. 3 and 4) which is pivotally mounted adjacent the top by a pair of bushings 81 secured by screws 82 to a head 83 so that the cylinder comprising the anti-bridging element 14 is free to pivot about this axis. The head or plate 83 is pivotally mounted about a pin 84 passing through the shaft 71 and thus provides a limited universal mounting for the anti-bridging cylinder 14 at its top on the shaft 71. The bottom portion of the plate 83 is enlarged and has a series of vertical slots 87 around its periphery to receive a pivot pin 88 for a depending lever 89 which is enlarged at its lower end to provide a projecting surface 91 which engages in a corresponding slot 92 in the wall of the cylinder 14. The lower notched end 91a of each lever 89 engages in a slot 94 of a plate 90 and is adapted to engage a portion of the cylinder to limit the amount of projecting movement. The plurality of levers 91 are encircled by a resilient O-ring 93 by which they are yieldably retained in a centralized position on the shaft 71.

Figure 4:
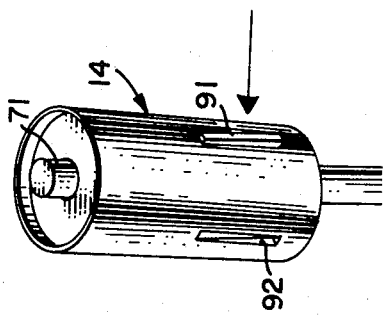
FIG. 4 is a perspective detail view of one of the anti-bridging elements.
Figure 3:
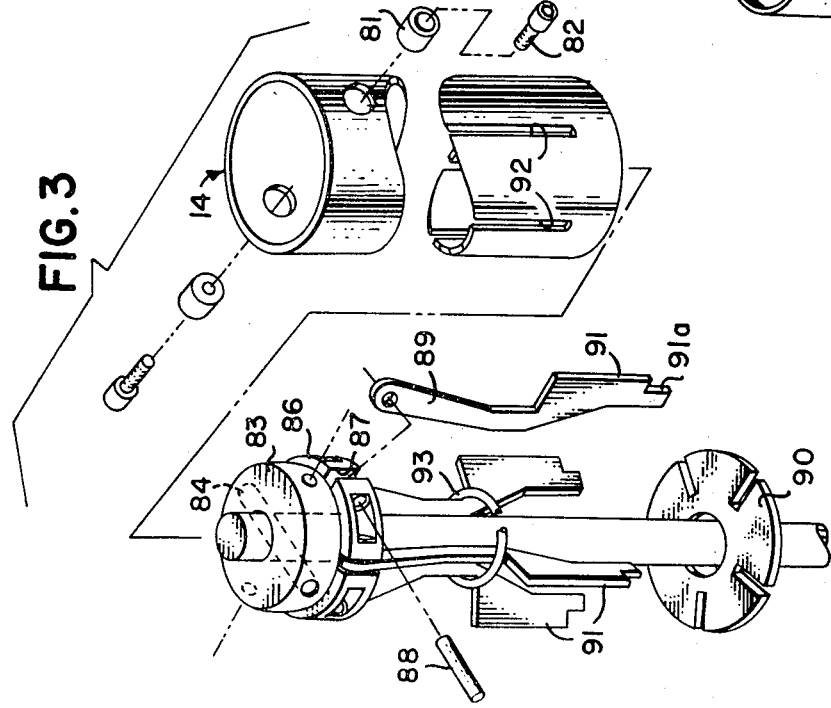
FIG. 3 is a perspective exploded view of one of the anti-bridging elements.

If bridging occurs whereby pressure is put on the lower end of an anti-bridging element or cylinder 14, this lower end will tilt as shown in FIG. 4, causing the anti-bridging drive elements 91 to project beyond the periphery of the cylinder 14 at this point and impact the fruit to break up any such bridge.

While I have shown and described a preferred apparatus and method for carrying out this invention, it is apparent that the invention is capable of variation and modification of the form shown so that the scope thereof should be limited only by the proper scope of the claims appended hereto.

I claim:

1. In a fruit feed system, horizontally disposed conveyor means for conveying fruit in bulk, an opening at one side of said conveyor means, and upright anti-bridging roller defining one side of said opening, and means mounting said roller for limited yielding movement, said anti-bridging roller including feed assisting means disposed normally in an inactive position, said feed assisting means being moved to an active position upon yielding movement of said roller.

2. A fruit feed system as defined in claim 1, in which a second upright anti-bridging roller having similar feed assisting means is provided to define the other side of said opening, and means for driving said rollers in the same direction whereby one rotates in a direction to assist fruit through an opening and the other rotates in a direction tending to prevent fruit from passing through the opening.

3. A fruit feed system as defined in claim 1, in which said roller is mounted for limited universal movement at its upper end and has a plurality of peripheral openings adjacent its lower end in the area of fruit contact thereof, and said feed assisting means comprises a plurality of fruit impelling elements normally disposed in retracted position in said openings in the upright position of said roller and upon yielding movement of said roller said fruit feed elements projecting on the side of the roller contacted by said fruit to provide a fruit impelling action to the fruit articles blocking the opening.

4. In a fruit feed system as recited in claim 1, in which said upright anti-bridging roller is provided with a central mounting shaft and has a limited universal mounting on said shaft adjacent the upper end of the roller.

5. In a fruit feed system as recited in claim 1, in which said roller is provided with a mounting shaft and means connecting said roller adjacent the upper end of the roller for tilting movement relative to the shaft.

* * * * *